United States Patent
Smith

(10) Patent No.: US 8,032,741 B2
(45) Date of Patent: Oct. 4, 2011

(54) METHOD AND APPARATUS FOR VIRTUALIZATION OF A MULTI-CONTEXT HARDWARE TRUSTED PLATFORM MODULE (TPM)

(75) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1077 days.

(21) Appl. No.: 11/894,915

(22) Filed: Aug. 22, 2007

(65) Prior Publication Data

US 2009/0055641 A1    Feb. 26, 2009

(51) Int. Cl.
*G06F 1/24* (2006.01)
*G06F 9/00* (2006.01)

(52) U.S. Cl. ............ 713/100; 713/189; 713/193; 726/2

(58) Field of Classification Search .................. 713/100, 713/189, 193; 726/2
See application file for complete search history.

(56) References Cited

U.S. PATENT DOCUMENTS

| | | | |
|---|---|---|---|
| 7,210,034 B2 | 4/2007 | Smith | 713/155 |
| 7,552,419 B2 * | 6/2009 | Zimmer et al. | 717/121 |
| 7,590,867 B2 * | 9/2009 | Scarlata et al. | 713/193 |
| 2005/0210467 A1 * | 9/2005 | Zimmer et al. | 718/1 |
| 2005/0246552 A1 * | 11/2005 | Bade et al. | 713/193 |
| 2006/0020781 A1 | 1/2006 | Scarlata et al. | 713/100 |
| 2006/0230439 A1 | 10/2006 | Smith et al. | 726/9 |
| 2007/0016766 A1 * | 1/2007 | Richmond et al. | 713/100 |
| 2007/0226786 A1 * | 9/2007 | Berger et al. | 726/9 |
| 2007/0255948 A1 * | 11/2007 | Ali et al. | 713/164 |
| 2007/0300069 A1 * | 12/2007 | Rozas | 713/176 |
| 2008/0155277 A1 * | 6/2008 | Bulusu et al. | 713/193 |
| 2008/0178176 A1 * | 7/2008 | Berger et al. | 718/1 |
| 2008/0244569 A1 * | 10/2008 | Challener et al. | 718/1 |

OTHER PUBLICATIONS

U.S. Appl. No. 11/171,134, filed Jun. 29, 2005, entitled "Method and Apparatus for Migrating Software-Based Security Coprocessors" by Vincent R. Scarlata, Carlos V. Rozas.
U.S. Appl. No. 11/474,778, filed Jun. 26, 2006, entitled "Associating A Multi-Context Trusted Platform Module With Distributed Platforms," by Carlos V. Rozas.

* cited by examiner

*Primary Examiner* — Thomas Lee
*Assistant Examiner* — Jaweed A Abbaszadeh
(74) *Attorney, Agent, or Firm* — Trop, Pruner & Hu, P.C.

(57) ABSTRACT

In one embodiment, the present invention includes a method for receiving a request for a trusted platform module (TPM) operation from a virtual machine, determining whether the request is for a modification of a TPM version, and associating part of a multi-context hardware TPM with a virtual TPM (vTPM) to enable the modification. Other embodiments are described and claimed.

15 Claims, 3 Drawing Sheets

METHOD AND APPARATUS FOR VIRTUALIZATION OF A MULTI-CONTEXT HARDWARE TRUSTED PLATFORM MODULE (TPM)

BACKGROUND

Modern computer systems include various resources including one or more processors, memory, chipset components, input/output (I/O) devices and the like. Due to the interaction between computers, security can be compromised. Accordingly, various features have been introduced to improve security. For example, in addition to memory and one or more processors, a system may include a trusted platform module (TPM). A TPM is a hardware component that resides within a system and provides various facilities and services for enhancing security. For example, a TPM may be used to protect data and to attest the configuration of a platform. The sub-components of a TPM may include an execution engine and secure non-volatile (NV) memory or storage. The secure NV memory is used to store sensitive information, such as encryption keys, and the execution engine protects the sensitive information according to the security policies to be implemented by the TPM. A TPM may be implemented in accordance with a specification such as the Trusted Computing Group (TCG) TPM Specification Version 1.2, dated Oct. 2, 2003 (the "TPM specification").

In general, a TCG-compliant TPM provides security services such as attesting to the identity and/or integrity of a platform, based on characteristics of the platform. Platform characteristics including hardware components of the platform, such as the processor(s) and chipset, can be communicated to the TPM through a platform endorsement credential provided by an authority (e.g., an original equipment manufacturer (OEM)).

DETAILED DESCRIPTION

In various embodiments, a platform may include a processor such as a central processing unit (CPU), a multi-context Trusted Platform Module (TPM) which may be integrated into a chipset, along with other devices such as memory (e.g., random access memory (RAM)), other chipset components and input/output (I/O) devices. Embodiments may also include a Virtual Machine Monitor (VMM) to operate with one or more virtual machines (VMs), one or more user VM partitions and a virtual TPM executive (e.g., domain zero (Dom0) or other VM partition). The TPM executive implements TPM sharing such that each VM partition may have a distinct (virtual) TPM resource with exclusive access. In some embodiments, the multi-context TPM can be implemented in manageability engine (ME) chipset hardware.

TPM services are provided in hardware and software through virtualization. The hardware TPM can be integrated into the chipset and support multiple TPM contexts such that more than one execution environment can instantiate TPM state. When virtualized, each virtual machine can be assigned a different TPM context by the integrated TPM (iTPM).

Hardware TPM architecture supports both integrated and discrete varieties of TPMs. However, if a discrete TPM is used, an integrated TPM may not be activated. Further, the discrete TPM is not required to support multiple contexts. A separate TPM context can be created for each execution environment that can exist on a platform including instances of virtual machines, instances of ME services and potentially other environments. The hardware TPM (hTPM) is virtualized by the VMM and a vTPM manager, which resides in a distinct partition containing only the code necessary to implement vTPM capabilities. The vTPM manager can maintain multiple virtual TPM contexts, one for each VM that is instantiated by the VMM. Note that multiple vTPM contexts per instance of iTPM context may be present. For example, the iTPM may instantiate two TPM contexts, one for a user operating system (UOS) and a second for a service operating system (SOS). For example, the vTPM manager may instantiate three vTPM contexts for each of three UOS VMs, all sharing the first iTPM context. Furthermore, five vTPM contexts may be created for each of five VMs, which share the second iTPM context.

Figure 1:
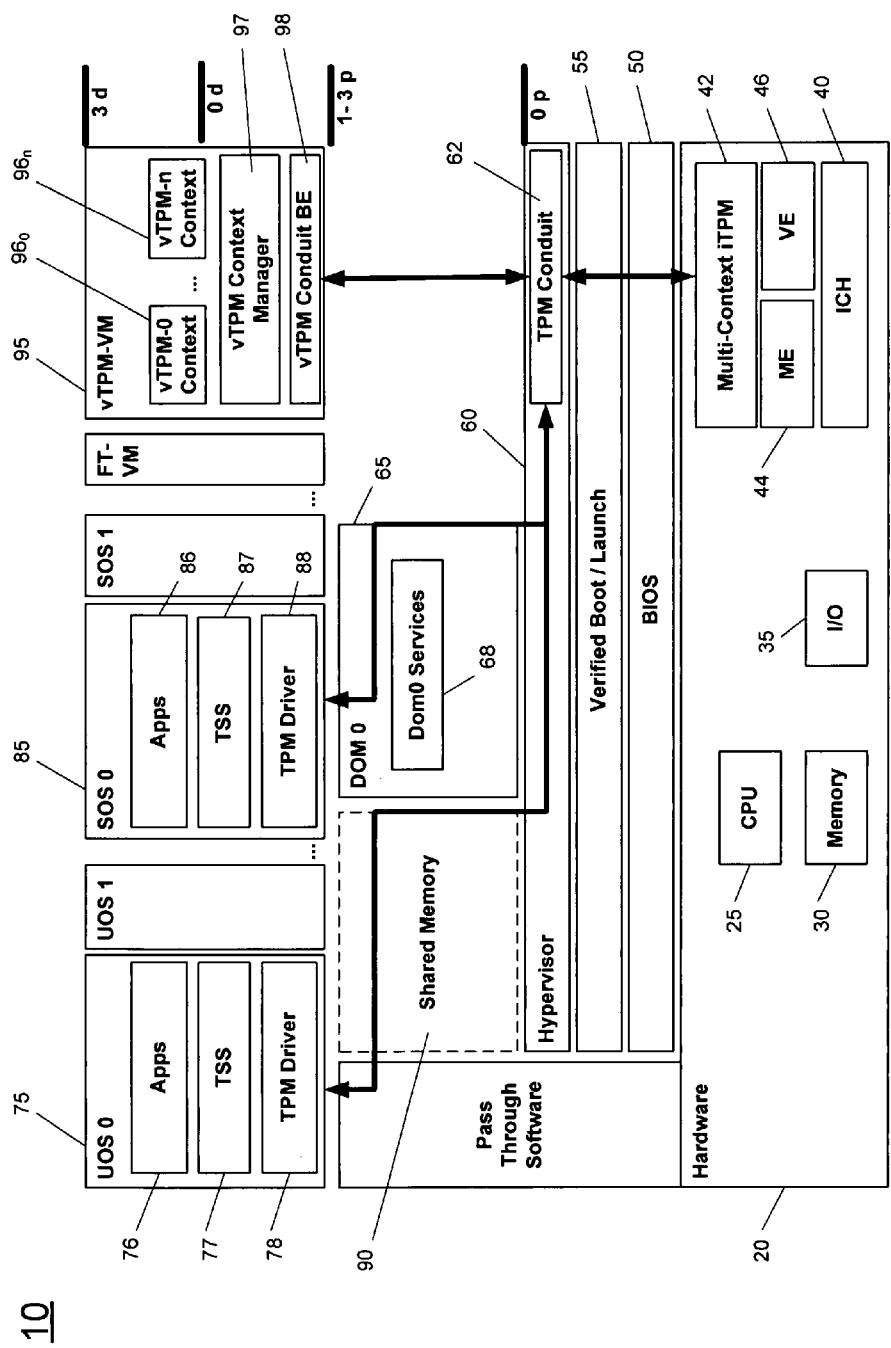
FIG. 1 is a block diagram of a system in accordance with one embodiment of the present invention.

Referring now to FIG. 1, shown is a block diagram of a system in accordance with one embodiment of the present invention. As shown in FIG. 1, system 10 includes various hardware 20. In the embodiment of FIG. 1, such hardware may include a central processing unit (CPU) 25, memory 30 which, in some embodiments may be dual in-line memory (DIMMs), one or more input/output (I/O) devices 35, as well as at least one chipset component 40. In the embodiment of FIG. 1, chipset component 40 may be an input/output controller hub (ICH). As shown in FIG. 1, ICH 40 may include a manageability engine (ME) 44 and a virtualization engine (VE) 46. Executing on at least ME 44 may be a multi-context integrated trusted platform module (iTPM) 42. In various embodiments, multi-context TPM 42 may provide hardware to perform TPM operations for a number of different contexts. Specifically, in the embodiment of FIG. 1, multi-context TPM 42 may perform TPM operations for multiple VMs.

TPM 42 provides the illusion of an unlimited number of hardware TPM devices in the chipset, limited only by resources. All TPM state is contained in a context structure that is swapped in/out as needed to service the associated execution environment. The association of an execution environment to iTPM context is performed by a trusted service running in virtual machine extension (VMX) root (e.g., VMM) or running as a privileged process in ME 44. The multi-context TPM thus executes on the ME and VE processing engines within the ICH 40. VE 46 performs iTPM context structure swapping and ME 44 implements iTPM logic that operates on a particular iTPM context. In some embodiments, ME 44 only operates on a single iTPM context structure at a time. All TPM state relating to the context is flushed when the current iTPM context is swapped out; before the new context is swapped in. ME 44 ensures the internal consistency of each context and protects the integrity of context structures. VE 46 operates on opaque context structures but maintains the binding of two identities. A context identifier is associated with an execution environment identifier. VE 46 can make and break these associations according to the lifecycle requirements of the environment. VE 46 also identifies/manages persistent storage resources for context structures and ensures availability requirements are met.

In one embodiment, a VMM can select the corresponding/appropriate iTPM instance using a unique instance identifier based on the instance of the virtual machine which may persist in a storage server and be downloaded to system 10 and loaded by the VMM. The identifier also disambiguates the currently loaded VMs such that the VM and iTPM context are always associated. The identifier is stored as part of the iTPM context and is validated before context state is altered. VE 46 may also verify the iTPM context identifier matches the VM identifier by comparing the saved copy of the VM identifier in the TPM context with the actual VM identifier. The TPM context is protected from tampering when stored in flash or other persistent media by encrypting the context using encryption keys that are stored in a TPM context #0, which may be present in flash and protected using various physical or package hardened techniques.

Referring still to FIG. 1, in addition to hardware 20, various software may be present in system 10. More specifically, a set of pass-through software may provide an interface between hardware 20 and multiple operating systems such as user operating systems (UOS) 75, service operating systems (SOS) 85, as well as one or more virtual TPM virtual machines 95. Note that multiple UOSs 75, SOSs 85, and VMs 95 may be present in different implementations.

In the specific embodiment of FIG. 1, pass-through software may include a basic input/output system (BIOS) 50, which in turn may launch a verified boot/launch 55 of the system. In turn, the launch may enable a hypervisor 60 or other such virtualization software. As shown in FIG. 1, hypervisor 60 may include a TPM conduit 62 which may enable a communication path between multi-context TPM 42 and VM 95, as will be discussed further below. TPM conduit 62 is a VMM resident module that routes TPM interface traffic to the appropriate TPM context manager. There are two TPM context managers in the platform; one is the TPM 42 the other is the vTPM context manager 97 contained in a VM partition. The TPM conduit 62 routes to the TPM 42 directly if no vTPM filtering or acceleration is needed. Otherwise, the request is routed to the vTPM context manager 97 to be processed. It is possible that vTPM manager 97 may invoke the TPM 42 to aid in processing the request. If so, TPM conduit 62 is again used to access the TPM 42. In addition, a shared memory 70, which may be virtualized memory, e.g., that is implemented in physical memory 30 may be present as well as one or more DOMs 65, one of which may act as a TPM executive, and which includes DOM0 services 68.

As further shown in FIG. 1, various software may be executed within each of the operating systems. Specifically, as shown in FIG. 1, UOS 75 may execute one or more applications 76. Still further, a trusted software stack (TSS) 77 may be present, along with a TPM driver 78. Each VM that requires TPM access uses a hTPM driver. The VMM virtualizes the vTPM interface according to the TCG TPM Interface specification, namely the 0xFED4xxxx addresses. The TPM driver may be a para-virtualized driver; meaning the driver issues VMM calls directly to gain access to TPM conduit 62. Similar software may be present in each SOS 85. For example, in SOS 85 applications 86 may be executed, along with a TSS 87, and a TPM driver 88.

As further shown in FIG. 1, each VM 95 may include multiple virtual vTPM contexts $96_0$-$96_n$ (generically vTPM context 96). Still further, a vTPM context manager 97 and a vTPM conduit backend (BE) 98 may be present. Note that pass-through software may generally run in a higher privilege level (e.g., a ring 0 privileged(p)-ring 3p level), while TPM drivers and the TSSs, along with the vTPM conduit BE and vTPM context manager may run in lesser privilege levels (e.g., ring 0d), while finally applications and the vTPM contexts may run in a still lower privilege level, e.g., ring 3d.

In each case, a TPM request contains source and destination information used to reliably maintain a virtual circuit between TPM context structure(s) and VM. vTPM conduit BE 98 is a driver in the vTPM virtual machine partition that interfaces with TPM conduit 62 using VMM calls. It provides the back-end interface to virtualized TPM drivers contained in User and Service partitions (e.g. UOS/SOS).

vTPM manager 97 virtualizes the TPM interface used by drivers in UOS/SOS. VM partitions may require a different version of the TPM than what is actually implemented in hardware. This allows a VM to experience the following: (1) upgrade to a newer version of a TPM specification without modifying hardware; (2) downgrade to an older version of the TPM specification without modifying hardware; (3) accelerate TPM commands by executing them on faster cores (not available to chipset hardware); and (4) filter TPM commands that a VM should not be permitted to perform. For example, the management functions of a TPM in a particular VM environment can be delegated to a service VM that is under tighter control by administrators. vTPM manager 97 may use iTPM resources to implement vTPM functionality. This is achieved by forwarding TPM command and arguments directly or by issuing new TPM commands that may be used to implement some dimension of the original command. vTPM manager 97 may consult a configuration file that sets defaults and instructs filtering behavior. The configuration file may be supplied by information technology (IT) personnel and is authenticated before use. The hTPM can be used to provide anchor keys or other policies under control of IT personnel. vTPM context structures are thus protected from external corruption or view by the virtual machine environment and by executing on the hTPM where appropriate. Protection of persistent context is satisfied by encrypting vTPM contexts prior to storage on flash or disk. Encryption keys are guarded by the hTPM storage capabilities. While shown with this particular implementation in the embodiment of FIG. 1, the scope of the present invention is not limited in this regard.

Figure 2:
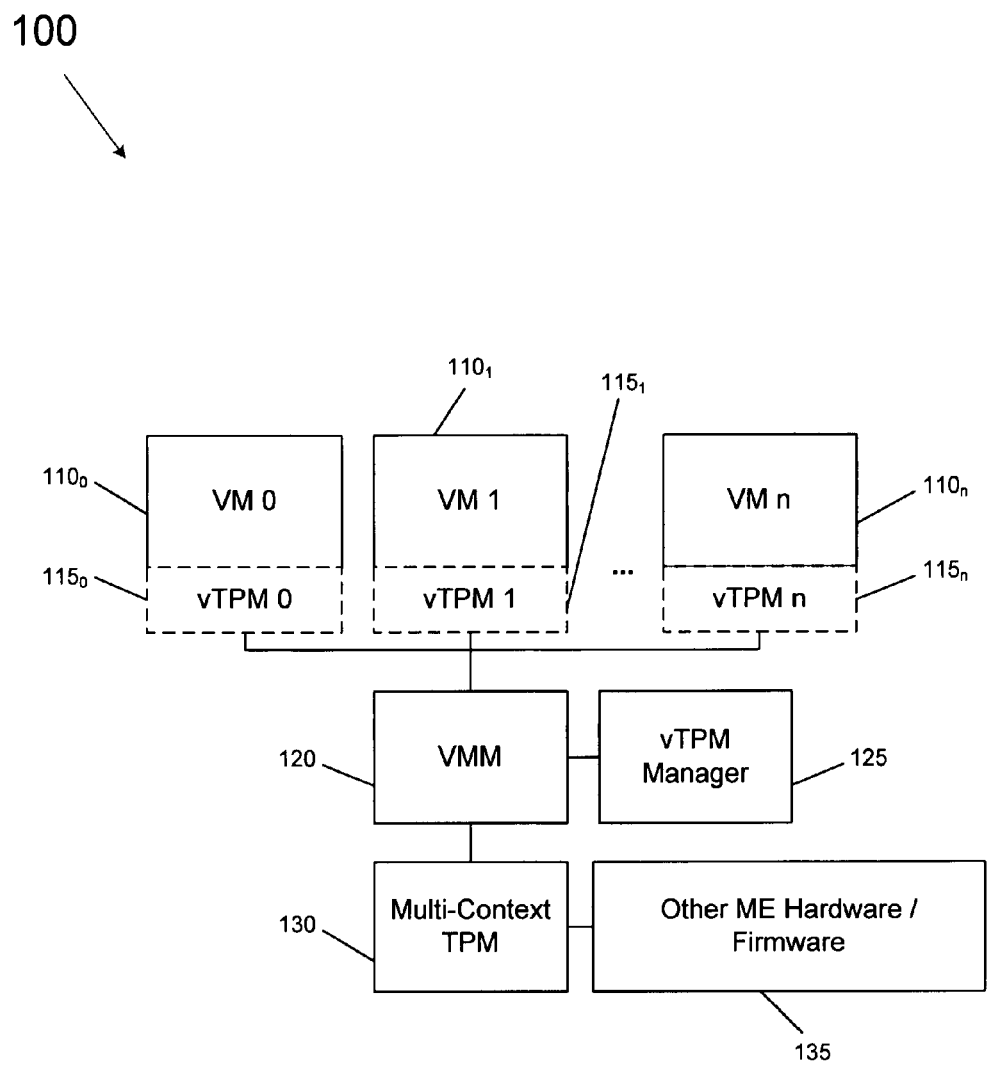
FIG. 2 is a block diagram of a system in accordance with another embodiment of the present invention.

Referring now to FIG. 2, shown is a block diagram of a system in accordance with another embodiment of the present invention that details the interaction between a plurality of virtual machines and a multi-context hardware TPM. Specifically, as shown in FIG. 2, system 100 includes a plurality of virtual machines $110_0$-$110_n$ (generically VM 110). Each VM 110 has a virtual TPM $115_0$-$115_n$ (generically vTPM 115) associated therewith. While shown in the embodiment of FIG. 2 as being part of its associated VM, understand that in some embodiments a separate vTPM virtual machine may house the vTPMs.

In the embodiment of FIG. 2, each VM 110 runs on a virtual machine monitor (120) which is associated with a vTPM manager 125. In various embodiments, vTPM manager 125 may filter commands as well as enable various upgrading/downgrading and accelerations in accordance with an embodiment of the present invention. In turn, VMM 120 may communicate with a multi-context TPM 130. While the scope of the present invention is not limited in this regard, in some embodiments multi-context TPM 130 may be a hardware TPM present in a chipset component such as an ICH. However, in other embodiments the TPM may be a separate integrated circuit, e.g., a fixed token affixed to a motherboard of the system. Multi-context TPM 130 may store state for each of the TPM contexts for each VM 110. In addition, multi-context TPM 130 may allocate TPM contexts for its own internal use, e.g., other hardware/firmware present within TPM 130, or in a larger chipset component in which TPM 130 is adapted. While shown with this particular implementation in the embodiment of FIG. 2, the scope of the present invention is not limited in this regard.

Figure 3:
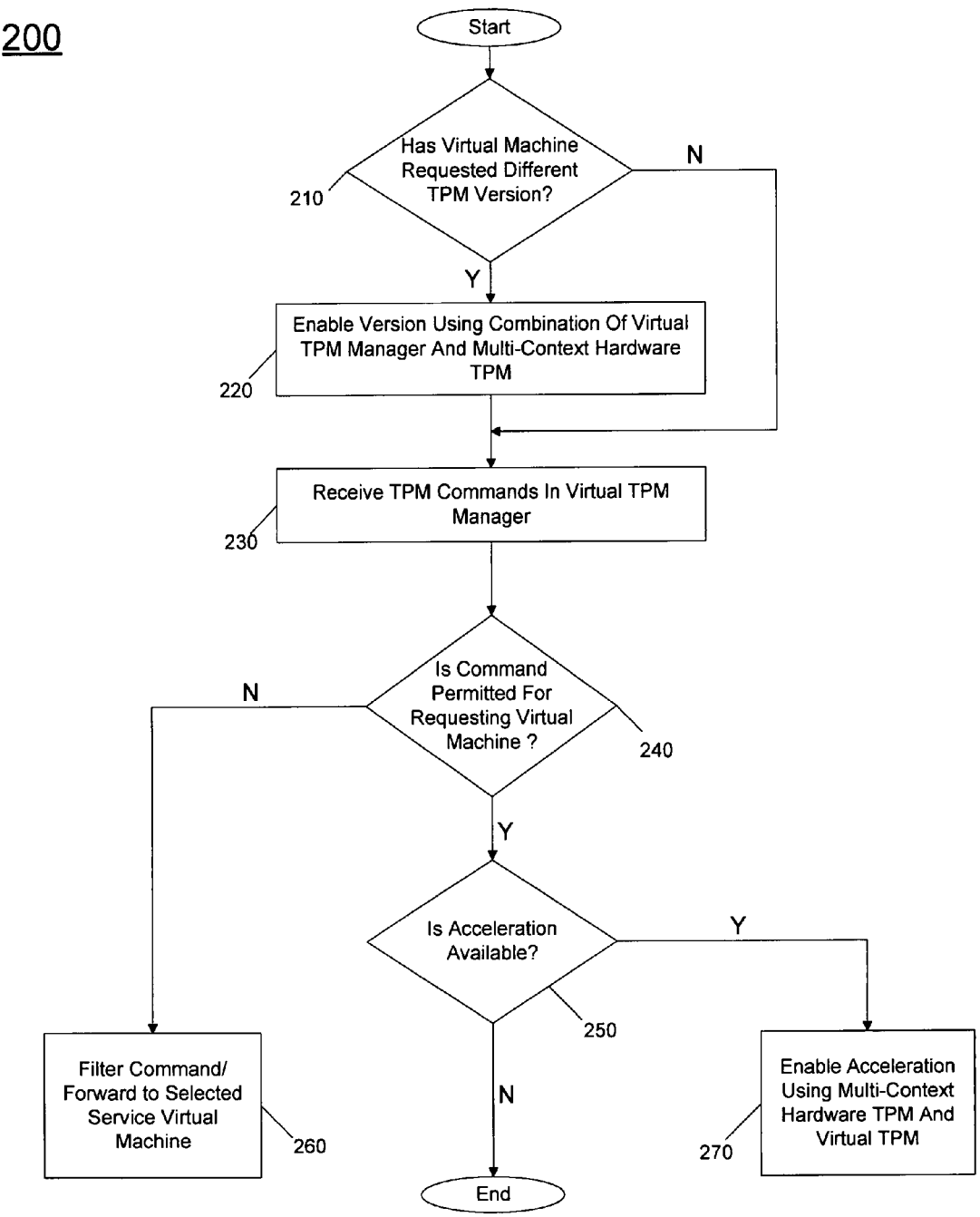
FIG. 3 is a flow diagram of a method in accordance with one embodiment of the present invention.

As described above, using a combination of virtual and hardware TPMs, embodiments may enable upgrades and downgrades as well as enable acceleration operations, filtering and so forth. Referring now to FIG. 3, shown is a flow diagram of a method in accordance with one embodiment of the present invention. As shown in FIG. 3, method 200 may begin by determining whether a virtual machine has requested a different TPM version (diamond 210). In one embodiment, a VM may request an upgrade or downgrade to a different version of a TPM specification. Such requests may be received by a vTPM context manager, in some embodiments. If such a request has been received, control passes to block 220, where the version requested may be enabled using a combination of the virtual TPM manager and the multi-context hardware TPM (block 220). In this way upgrades and downgrades may occur without changing hardware. For an example upgrade, various operations to be performed in the upgraded version may be enabled by using the hardware TPM as well as additional operations using one or more virtual TPM contexts. Similarly, to enable a downgrade various hardware features may be disabled in the associated context of the multi-context hardware TPM.

Control then passes to block 230, where TPM commands may be received in the virtual TPM manager (block 230). Various such commands may be received from one or more virtual machines. After receiving such commands, the virtual TPM manager may analyze the messages to confirm that the command is appropriate for the given virtual machine (diamond 240). For example, some commands may not be permitted for a given instance of a virtual machine. If so control passes to block 260 where the commands may be filtered. As an example, filtered commands may be sent to a selected service virtual machine for execution. Of course other processing may occur. If it is determined at diamond 240 that the command is permitted, control may pass to diamond 250 where it may be determined whether acceleration of the command is available. The decision to accelerate a command may be based on a type of message, available resources and so forth. If such acceleration is available, control passes to block 270 where the acceleration is enabled using both the multi-context hardware TPM as well as one or more virtual TPMs, otherwise the command may be performed per the native request, and method 200 concludes. While shown with this particular implementation in the embodiment of FIG. 3, the scope of the present invention is not limited in this regard.

Embodiments thus use integrated multi-context TPMs as a fundamental building block in a chipset and for virtualization layers below operating systems. Chipset integration of TPM includes partial or full virtualization of TPM in hardware. Embodiments further allow more flexibility along platform vectors of security, manageability, usability and performance. By allowing some features of the TPM to be implemented in software, these features benefit from high-performance capabilities of the main CPU. Other features pertaining to management of the TPM can be filtered or redirected to a management partition that is isolated from unprivileged users. Keys, platform configuration registers (PCRs) and other resources that must be protected from attack have their own context in hardware where full protection afforded by the hardware boundary comes into play.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving a request for a trusted platform module (TPM) operation from a first virtual machine in a virtual TPM (vTPM) manager;
determining whether the request is for a modification of a TPM version associated with the first virtual machine; and
if so, associating a portion of a multi-context hardware TPM associated with the first virtual machine with a virtual TPM (vTPM) associated with the first virtual machine to enable the modification of the TPM version.

2. The method of claim 1, further comprising filtering a command received from a second virtual machine in the vTPM manager and forwarding the command to a selected service virtual machine for execution, wherein a context of the multi-context hardware TPM associated with the second virtual machine is not able to perform the command.

3. The method of claim 1, further comprising accelerating a request from a second virtual machine by communicating at least a portion of the request to an associated context of the multi-context hardware TPM and to a virtual TPM associated with the second virtual machine.

4. The method of claim 1, further comprising maintaining TPM state for a plurality of virtual machines in a chipset component, and loading a first TPM state associated with the first virtual machine into the multi-context hardware TPM, wherein the multi-context hardware TPM executes on a manageability engine of the chipset component.

5. The method of claim 4, further comprising loading the first TPM state into the manageability engine using a virtualization engine of the chipset component if an instance identifier associated with the first TPM state matches an instance identifier obtained from a remote server.

6. The method of claim 3, wherein accelerating the request comprises communicating the request portion to the multi-context hardware TPM using a TPM conduit of pass-through software executing between the multi-context hardware TPM and a virtual machine including the vTPM manager.

7. The method of claim 1, further comprising instantiating a plurality of vTPM contexts using the vTPM manager, wherein each of the plurality of vTPM contexts is associated with one of a plurality of virtual machines, and wherein the plurality of vTPM contexts share a first context of the multi-context hardware TPM.

8. The method of claim 7, wherein each of the plurality of vTPM contexts is associated with a user operating system, and further comprising instantiating a second plurality of vTPM contexts using the vTPM manager, wherein each of the second plurality of vTPM contexts is associated with one of a plurality of virtual machines of a service operating system, and wherein the second plurality of vTPM contexts share a second context of the multi-context hardware TPM.

9. An article comprising a non-transitory machine accessible medium including instructions that when executed cause a system to:
receive a request for a trusted platform module (TPM) operation from a first virtual machine in a virtual TPM (vTPM) manager;
accelerate the request by communication of at least a portion of the request to each of an associated context of a multi-context hardware TPM and to a virtual TPM (vTPM) associated with the first virtual machine, the communication to the multi-context hardware TPM via a TPM conduit of pass-through software executed between the multi-context hardware TPM and a second virtual machine including the vTPM manager.

10. The article of claim 9, further comprising instructions that when executed enable the system to filter a command received from a third virtual machine in the vTPM manager and forward the command to a selected service virtual machine for execution, wherein a context of the multi-context hardware TPM associated with the third virtual machine is not able to perform the command.

11. The article of claim 9, further comprising instructions that when executed enable the system to maintain TPM state for a plurality of virtual machines in a chipset component, load a first TPM state associated with the first virtual machine into a manageability engine of the chipset component using a virtualization engine of the chipset component, wherein the multi-context hardware TPM executes on the manageability engine.

12. The article of claim 9, further comprising instructions that when executed enable the system to determine whether the request is for a modification of a TPM version associated with the first virtual machine, and if so, associate the associated context of the multi-context hardware TPM with the associated vTPM to enable the modification of the TPM version.

13. The article of claim 9, further comprising instructions that when executed enable the system to instantiate a first plurality of vTPM contexts each associated with one of a plurality of virtual machines of a user operating system using the vTPM manager, and instantiate a second plurality of vTPM contexts each associated with one of a plurality of virtual machines of a service operating system using the vTPM manager, and wherein the first plurality of vTPM contexts share a first context of the multi-context hardware TPM and the second plurality of vTPM contexts share a second context of the multi-context hardware TPM.

14. A system comprising:
a processor to execute instructions;
a chipset coupled to the processor, the chipset including a multi-context hardware trusted platform module (TPM) including a first context and a second context, wherein a TPM manager is to instantiate a first plurality of virtual TPM (vTPM) contexts each associated with one of a plurality of user virtual machines to execute using the first context, and instantiate a second plurality of vTPM contexts each associated with one of a plurality of service virtual machines to execute using the second context; and
a dynamic random access memory (DRAM) coupled to the chipset.

15. The system of claim 14, wherein the chipset includes a manageability engine (ME) and a virtualization engine (VE), wherein the multi-context hardware TPM is to execute on the ME and the VE is to load the first and second contexts into and out of the ME based on a comparison between a saved copy of a virtual machine (VM) identifier associated with the first and second contexts and a current VM identifier.

* * * * *